United States Patent [19]
Wood et al.

[11] 3,882,417
[45] May 6, 1975

[54] GAS ION LASER CONSTRUCTION FOR ELECTRICALLY ISOLATING THE PRESSURE GAUGE THEREOF

[75] Inventors: Charles E. Wood, Manhattan Beach; Robert S. Witte, Redondo Beach, both of Calif.

[73] Assignee: TRW Inc., Redondo Beach, Calif.

[22] Filed: Sept. 10, 1973

[21] Appl. No.: 395,895

[52] U.S. Cl............ 331/94.5 T; 315/108; 331/94.5G
[51] Int. Cl.............................................. H01s 3/22
[58] Field of Search.................... 331/94.5; 330/4.3; 315/108

[56] References Cited
UNITED STATES PATENTS

| | | | |
|---|---|---|---|
| 3,424,997 | 1/1969 | Lopez et al. | 331/94.5 G |
| 3,745,483 | 7/1973 | Huchital et al. | 331/94.5 G |

*Primary Examiner*—Robert J. Webster
*Attorney, Agent, or Firm*—Daniel T. Anderson, Esq.; Edwin A. Oser, Esq.; Jerry A. Dinardo

[57] ABSTRACT

A gas ion laser of the type provided with a pressure gauge and a gas pressure reservoir connected to the laser through a valve. The valve and the pressure gauge are electrically insulated from the laser discharge path by connecting them in series with the cathode of the laser. The laser cathode can be grounded and preferably is a cold cathode although a hot cathode may be used instead. The cold cathode is provided with a central aperture to which is connected both the pressure gauge and the gas pressure reservoir through the valve. This will effectively prevent electric discharges from passing either to the pressure gauge or the valve which would otherwise destroy the pressure gauge.

5 Claims, 3 Drawing Figures

PATENTED MAY 6 1975 3,882,417

GAS ION LASER CONSTRUCTION FOR ELECTRICALLY ISOLATING THE PRESSURE GAUGE THEREOF

The invention described herein was made in the performance of work under a NASA contract and is subject to the provisions of Section 305 of the National Aeronautics and Space Act of 1958, Public Law 85-568 (72 STAT. 435; 42 USC 2457).

BACKGROUND OF THE INVENTION

This invention relates generally to gas lasers, and particularly relates to a gas ion laser of the type requiring a pressure sensing gauge as well as a gas reservoir for controlling the pressure of the gas in the laser.

It is well known that gas ion lasers usually require a gas reservoir which is arranged in parallel with the laser discharge tube. Such gas ion lasers are shown for example in in the patent to Neusel U.S. Pat. No. 3,466,567 and the patent to Witte U.S. Pat. No. 3,699,470, both being assigned to the assignee of the present application. As pointed out in these prior patents it is necessary to prevent the electric discharge which normally passes through the laser tube from also passing through the gas reservoir.

In order to minimize this undesired gas discharge through the gas reservoir of the laser the Neusel patent above referred to has suggested the use of a hold-off electrode in the tube interconnecting the laser discharge tube to the gas reservoir. The Witte patent above referred to has solved the same problem by inserting an electrically conductive tube in the passage interconnecting the laser discharge tube with the gas reservoir of the laser.

Both of these prior art ion lasers have been found to be very effective for the purpose for which they were designed, i.e., for substantially preventing a gas discharge through the gas reservoir. However, the provisions of an electrically conductive tube between the gas reservoir and the laser discharge tube has the disadvantage of providing a high impedance to the flow of gas. On the other hand, the hold-off electrode adds to the complexity of the laser construction.

Additionally, both of these constructions may still permit agas discharge to pass occasionally through the gas reservoir. This does not impede the proper operation of the laser. However, if such a gas discharge should pass to the pressure gauge of the laser it will destroy the pressure gauge. Furthermore, the gas reservoir usually is connected to the laser through a valve and it is desirable to maintain this valve at ground potential so as to minimize any danger to the operator due to the high voltage which normally exists between the laser electrodes.

On the other hand, the provision of the pressure gauge in communication with the laser discharge tube is vital for the operation of certain types of lasers. They usually have to be run in at a relatively high gas pressure and therefore the pressure must be carefully watched. On the other hand, particularly at higher than normal pressures the gas discharge has a tendency to pass through the gas reservoir which in turn would destroy the pressure gauge.

It is accordingly an object of the present invention to provide a gas ion laser having means of protecting the pressure gauge of the laser which must be in communication with the laser discharge tube.

Another object of the present invention is to provide a gas ion laser of the type disclosed which permits to ground not only the pressure gauge but the valve interposed between the gas reservoir and the laser discharge tube.

A further object of the present invention is to provide a gas ion laser having a cold cathode and having means for protecting the pressure gauge of the laser from an electric gas discharge.

SUMMARY OF THE INVENTION

In accordance with the present invention there is provided a gas ion laser which comprises a main envelope for the gas discharge which consists of an insulating material and includes an ionizable laserable gas. A cathode and an anode are disposed spaced from each other and in communication with the main envelope. A pressure gauge is provided for measuring the pressure in the main envelope. A connection is provided for interconnecting the pressure gauge with the main envelope through the cathode in such a manner that a series connection is formed between the anode, the cathode and the pressure gauge in the order named. Finally there is a restricted metallic connection interposed between the cathode and the pressure gauge for preventing the discharge which normally passes through the main envelope to the pressure gauge.

Accordingly, one of the features of the present invention is to arrange the pressure gauge as well as the gas reservoir, if required, in series with the cathode and the main envelope through which the gas discharge of the laser passes. This in turn makes it possible to maintain the cathode at a fixed reference potential, that is at ground. Accordingly, the pressure gauge may also be maintained at ground as well as a valve which may be provided between the gas reservoir and the remainder of the laser. This will protect the operator from electric shocks when touching the valve.

Additionally, the cathode may be a cold cathode as disclosed in the patent to Witte et al. U.S. Pat. No. 3,555,451 and in a second patent to Witte et al. U.S. Pat. No. 3,688,217. Both of these patents are assigned to the assignee of the present invention. The first one of these patents discloses the use of indium, gallium, bismuth, tin and lead as suitable for a cold cathode. The second patent discloses the use of aluminum, copper, nickel, silver and tungsten as suitable for a cold cathode. In accordance with the present invention, the cold cathode is provided with a central aperture which in turn is connected with the pressure gauge through a suitable tube.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENT

Figure 1:
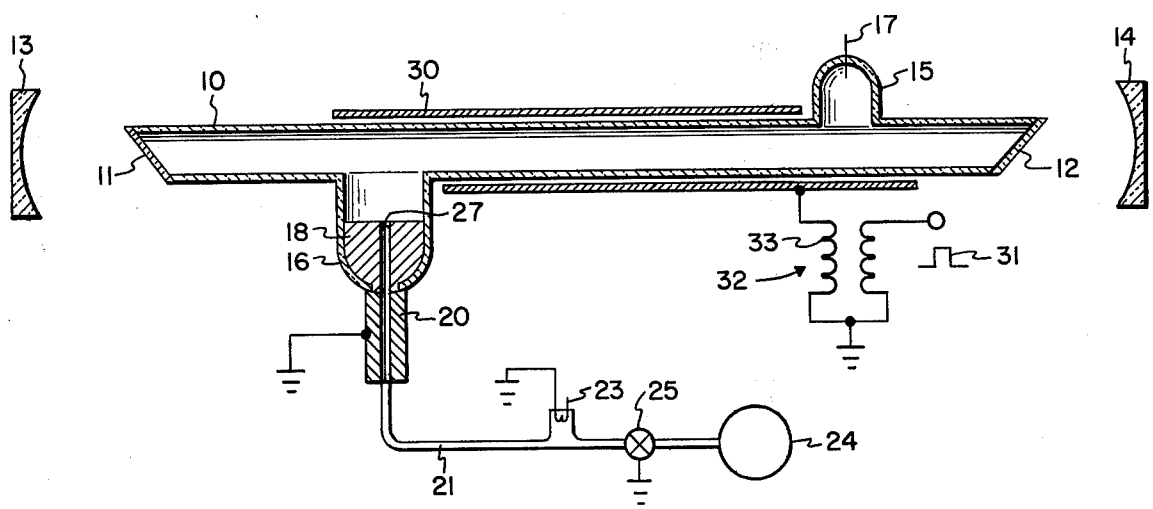
FIG. 1 is a sectional view of a gas ion laser having a cold cathode and embodying the present invention.

Referring now to the drawing and particularly to FIG. 1, there is illustrated a gas ion laser embodying the present invention. The laser may, for example, include an ionizable laserable gas such as argon, krypton, xenon, and the like. The laser includes a main envelope 10 through which the gas discharge may be permitted to pass. The envelope 10 preferably consists of an insulating material such for example as glass, quartz or a suitable ceramic. The envelope 10 is provided with two windows, 11 and 12, which are transparent to the light produced by the laser. They may be disposed at the Brewster angle which is such that the light passes through substantially without reflection losses. The Brewster windows 11 and 12 will also incidentally polarize the light.

There are also provided two mirrors, 13 and 14, forming a resonant cavity or mode selector for the laser radiation. As shown the mirrors 13 and 14 may be spherical to minimize the problems of adjustment. One of the mirrors, say mirror 13, may be designed to reflect substantially all of the radiation, while the other mirror, say mirror 14, may be arranged to pass a predetermined percentage of the light to generate an output beam.

The main envelope 10 may be provided with two appendages 15 and 16 which as shown are disposed spaced from each other and in communication with the main envelope 10. An anode 17 may be disposed in the appendage 15. The anode 17 may, for example, consist of a tungsten wire extending through the appendage 15. The cathode 18 may, for example, be a cold cathode consisting of any of the materials referred to in the two Witte et al. patents and previously referred to. Thus, by way of example, the cold cathode 18 may consist of indium.

The appendage 16 extends into a conductive tube 20 which may consist of any suitable metal. Preferably, however, the tube 20 is an alloy consisting of iron, nickel and cobalt which is sold under the trade name "Kovar." Such an alloy has substantially the same coefficient of expansion as does glass and may therefore be readily sealed by means of an interconnecting portion or graded seal to the appendage 16. Such an interconnecting portion may consist of a plurality of different glasses joined together to form a graded seal which matches the coefficient of expansion of tube 20 to that of the remainder of the appendage 16. Connected to the tube 20 by another interconnecting tube 21 is the pressure gauge 23 which may, for example, consist of a heated wire and which is conventional. The tube 21 may again consist of glass or quartz or alternatively of a suitable metal. A gas reservoir 24 may be connected to the tube 21 through a valve 25 shown schematically in FIG. 1. The valve 25 may be grounded as shown as is the pressure gauge 23.

The tube 21 if made of metal may be connected to the tube 20 made of Kovar by silver solder. If the tube 21 is made of metal it preferably consists of oxygen-free copper. This will minimize the danger of contamination of the ionizable gas.

The central opening 27 through the cold cathode 18 is small in diameter compared to the diameter of the main discharge tube or main envelope 10. This will also minimize the danger of a discharge passing through the tube 21 to the pressure gauge 23.

The laser illustrated in FIG. 1 operates in a conventional manner. A relatively high voltage is applied between the anode 17 and the cathode 18, that is a high positive voltage is applied to the anode 17 since the cathode 18 is grounded. Such a gas laser can be made to operate without a trigger electrode as long as a high enough voltage is applied between its two electrodes. As long as the tube is operated above the breakdown voltage of the gas it will fire, but usually at random.

Therefore, in some cases it may be desirable to provide a trigger electrode which will preionize the gas in the main envelope 10. This discharge may then be maintained by a lower voltage applied between the electrodes 17 and 18. In other words, this will separate the function of maintaining the discharge as compared to the function of preionizing the gas which in turn permits the discharge to take place. Accordingly, a trigger electrode permits to control independently breakdown and discharge functions. Accordingly, a trigger electrode 30 may be disposed about the main envelope 10 and may extend to a region below the anode 17. As shown schematically in FIG. 1, a positive pulse 31 may be applied to the transformer 32 having one terminal of the pair of windings grounded. This in turn will generate in the secondary winding 33 a sufficiently high positive pulse which is applied to the trigger electrode 30 to preionize the gas. However, as indicated before such a trigger electrode is not always necessary and may be omitted.

The central aperture 27 through the cold cathode 18 does not impair the function and operation of the cold cathode. This is due to the fact that the emission takes place primarily around the edge of the cold cathode, that is around the region adjacent to the wall of the appendage 16.

Figures 2, 3:
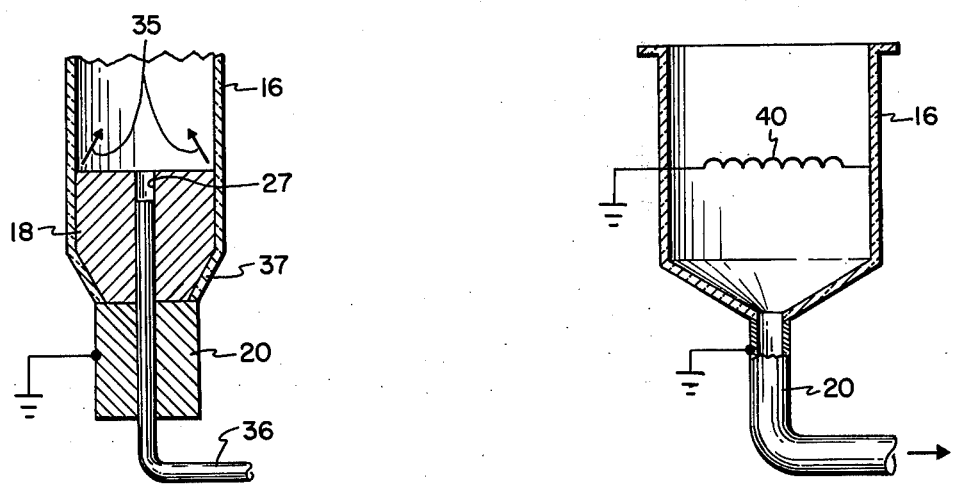
FIG. 2 is a sectional view on enlarged scale of the cold cathode of the laser of FIG. 1 illustrating a metallic tube extending partly through a central aperture in the cathode.
FIG. 3 is an enlarged sectional view similar to that of FIG. 2 and illustrating a hot cathode which may be used with the laser of the invention.

This has been indicated by the arrows 35 in FIG. 2 which indicate the emission from the edge of the cold cathode 18. FIG. 2 does show a modification of the cold cathode of FIG. 1. Here a tube 16 is shown which may consist of some insulating material such as glass or quartz while the lower tube 20 may consist of Kovar. The cold cathode 18 may consist of indium. A graded seal 37 may interconnect the Kovar tube 20 to the quartz or glass appendage 16. Otherwise, the modification of the cathode of FIG. 2 does not change the operation of the laser previously disclosed.

However, it is not necessary that the cathode consist of a cold cathode. It is feasible to provide a hot cathode for the laser of the invention. This has been illustrated in FIG. 3 to which reference is now made.

Here the hot cathode is shown schematically at 40 as a wire having one end grounded as shown. The appendage 16 continues to connect to a metal tube 20 of much reduced diameter which may be grounded as shown. However, the operation of the laser is the same as that previously explained.

There has thus been disclosed a gas ion laser having provision for positively protecting the pressure gauge of the laser from any accidental discharge. This is effected by connecting the pressure gauge as well as a gas reservoir when needed serially with the main laser envelope. The connection is made through the cathode.

The cathode may, for example, be a cold cathode having a central aperture interconnecting the pressure gauge to the main envelope. Alternatively, a hot cathode may be used which continues through a metallic connection of reduced diameter to the pressure gauge. The resultant construction is simple and may easily be made without substantially increasing the price of the instrument. The laser of the invention has been operated successfully.

What is claimed is:

1. A gas ion laser comprising:
   a. a main envelope consisting of an insulating material and including an ionizable laserable gas;
   b. a first appendix in communication with said main envelope;
   c. an anode disposed in said first appendix;
   d. a second appendix in communication with said main envelope;
   e. a cathode disposed in said second appendix, said cathode being a cold cathode formed by a slug of metal substantially filling said second appendix and having a central aperture therethrough;
   f. a pressure gauge for measuring the pressure in said main envelope;
   g. a metallic tube interconnecting said central aperture in said cathode with said pressure gauge, whereby said anode, said cathode and said pressure gauge are interconnected in series to permit a continuous gas movement therein, said metallic tube extending partially through the central aperture in said cathode;
   h. means coupled to said anode and to said cathode for applying an electric potential thereto and for creating a discharge through said main envelope in the laserable gas; and
   i. means optically coupled to said main envelope for stimulating a coherent beam of radiation from the laserable gas.

2. A laser as defined in claim 1 wherein said cold cathode consists of indium.

3. A laser as defined in claim 1 wherein a gas reservoir and a valve are connected to said tube.

4. A laser as defined in claim 1 wherein means is provided for maintaining said cathode at a fixed reference potential.

5. A laser as defined in claim 1 wherein a trigger electrode is provided which substantially surrounds said main envelope and said anode for preionizing said laserable gas to facilitate lasing action thereof.

* * * * *